Sept. 11, 1951   A. J. EHLSCHLAGER   2,567,700
APPARATUS FOR MAKING ELECTRICAL MEASUREMENTS
Filed Sept. 11, 1946   2 Sheets-Sheet 1

INVENTOR
A. J. EHLSCHLAGER
BY
ATTORNEY

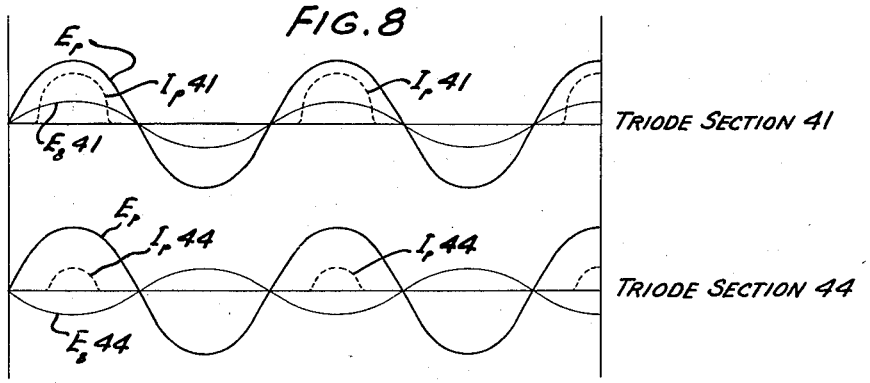
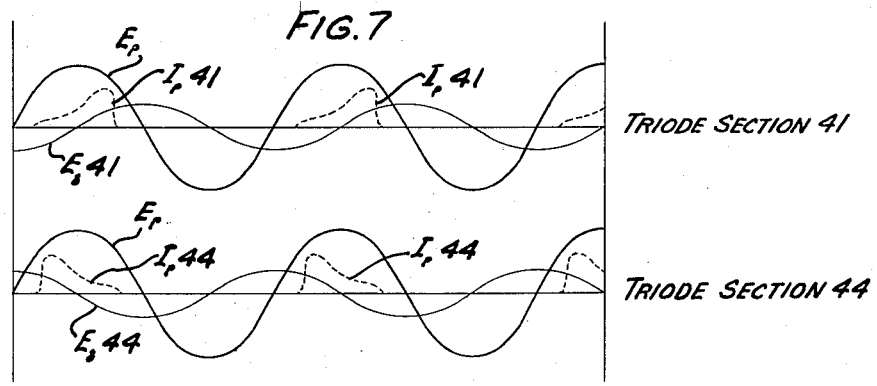
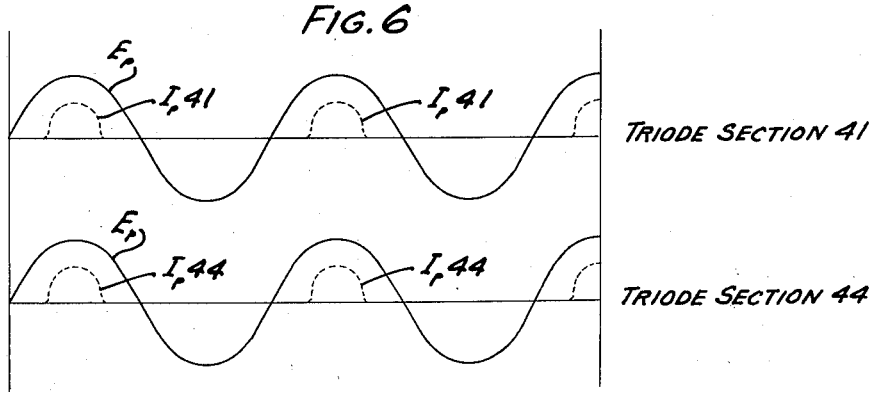
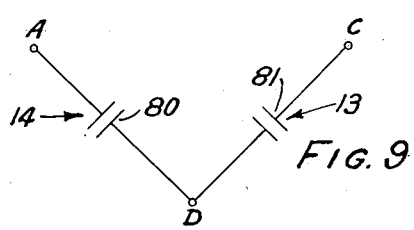

Patented Sept. 11, 1951

2,567,700

UNITED STATES PATENT OFFICE 2,567,700

APPARATUS FOR MAKING ELECTRICAL MEASUREMENTS

Arthur J. Ehlschlager, Elmwood Park, Ill., assignor to Western Electric Company, Incorporated, New York, N. Y., a corporation of New York Application September 11, 1946, Serial No. 696,113

4 Claims. (Cl. 175—183)

This invention relates to a method of and apparatus for making electrical measurements and more particularly to a method of and apparatus for determining the characteristics of reactance devices.

In measuring electrical properties of reactive devices on ordinary alternating current bridges, it is usual to zero-balance the bridge to make the measurement. This usually requires two controls if the phase angle of one arm is different from that of an adjacent arm. Obviously, where rapidity of measurements is necessary, for example, in the manufacture of inductance coils on a production basis, it is desirable to reduce the number of adjustments to a minimum.

Objects of this invention are to provide a method of an apparatus for rapidly determining the degree and direction of deviation of the electrical characteristics of an electrical device from those of a standard.

In accordance with one embodiment of this invention, the inductance of a coil may be determined by connecting it in one arm of an alternating current bridge having a standard coil in another arm and connecting the output of the bridge to a detector that will respond only to those components of the bridge output voltage which are in phase or 180° out of phase with the bridge input voltage. The bridge output is connected to the grids of a pair of similar triode electronic tubes which are supplied with a plate voltage synchronous with the bridge input voltage. The triodes must be operated within the straight line portion of their grid voltage-plate current characteristic curve. A sensitive D. C. galvanometer is connected between the plates of the two triodes to register the magnitude and direction of any differential currents through the tubes. When the bridge is in inductive balance, the current through both triodes is equal and the galvanometer will register zero; however, if there is an inductive unbalance between the arms of the bridge, the bridge will have an output voltage having components in and out of phase with the bridge input voltage which output voltage will be impressed on the grids of the triodes causing unequal currents to flow in the tubes, thereby providing a differential current through the galvanometer which will indicate the magnitude and direction of the unbalance in the bridge.

A complete understanding of the invention may be had by reference to the following detailed description taken in conjunction with the accompanying drawings, in which Fig. 1 is a circuit diagram of a preferred embodiment of the invention;

Fig. 6 is a graph showing the relationship between the plate voltage and the plate current curves of both triode sections with zero-signal voltage on the grids;

Fig. 7 is a graph of the voltage and current curves of both triodes when the grid signal voltage is 90° out of phase with the plate voltage in one triode and 270° out of phase with the plate voltage in the other triode;

Fig. 8 is a graph showing voltage and current relationships in both triodes when the grid signal-voltage is in phase with the plate voltage in one triode and 180° out of phase with the plate voltage in the second triode; and Fig. 9 is a circuit diagram of a portion of the bridge circuit illustrating an embodiment of the invention wherein condensers may be tested instead of inductances.

Figure 1:
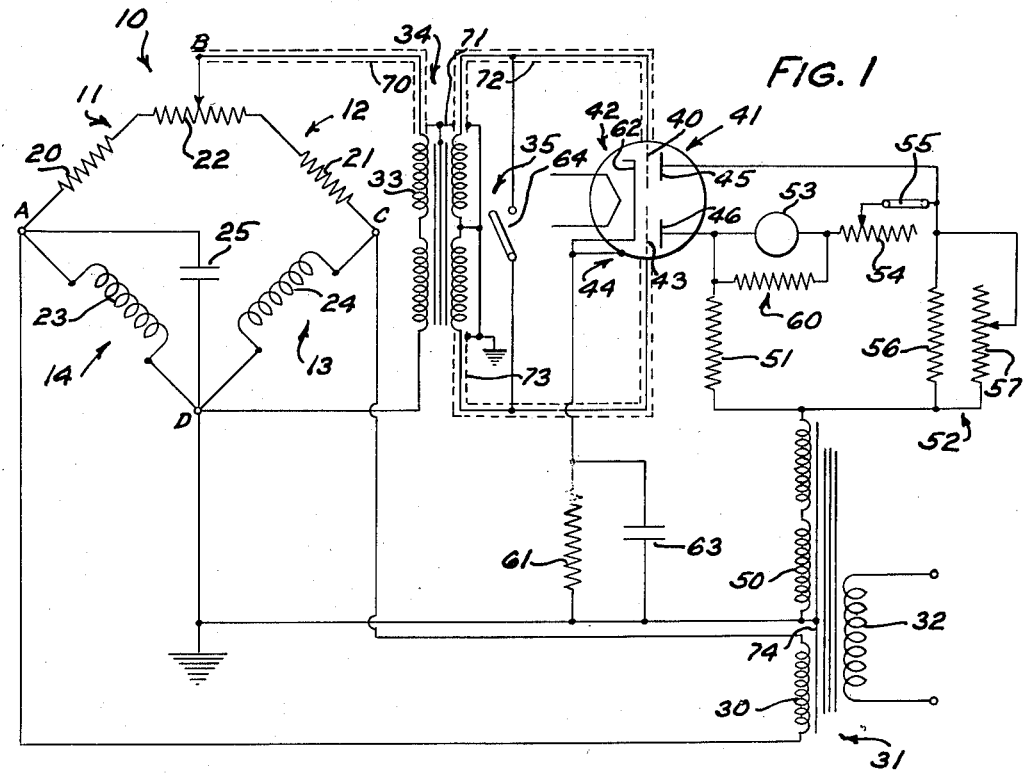

As shown in the drawings, the apparatus is provided with an alternating current bridge 10 having four arms 11, 12, 13 and 14. Equal value non-inductive resistors 20 and 21 are connected in the arms 11 and 12, respectively, and a variable bridge control 22 in the form of a potentiometer is connected between the arms 11 and 12. Provision is made to connect a standard inductance 23 in the bridge arm 14 and an inductance under test 24 in the arm 13.

In case the distributed capacity associated with the bridge arms is not balanced, it may be necessary to compensate in the arm having the lowest capacity by shunting the arm, for example, arm 14, with a condenser 25 of the proper capacity. An alternating voltage is supplied to the bridge at points A and C, the input terminals of the bridge, which are connected to the terminals of a secondary winding 30 of a transformer 31, the primary coil 32 of which is connected to a suitable alternating current source (not shown). The output terminals of the bridge designated as B and D are connected to the primary winding 33 of a transformer 34 having a secondary winding 35, one end of which is connected to a grid 40 of one triode section 41 of an electronic tube 42. The other end of the secondary winding 35 is connected to a grid 43 of another triode section 44 of the tube 42 having characteristics similar to those of the section 41, and the center tap of the winding 35 is grounded as is the D-point of the bridge.

Associated with the tube sections 41 and 44 are anodes 45 and 46, respectively, supplied with an anode voltage from a source of voltage synchronous with the bridge input voltage which source may be another secondary winding 50 of the transformer 31. One end of the secondary winding 50 is connected to the anodes 45 and 46 through voltage dropping resistors 51 and 52, respectively, the resistor 52 comprising a fixed resistor 56 and a variable resistor 57. The resistors 51 and 52 are substantially the same value but the resistor 52 is made variable to permit balancing of the voltages. A D. C. galvanometer 53, insensitive to instantaneous currents, is connected between the anodes 45 and 46 through a gain control 54 and an on-and-off switch 55. In order to critically damp the galvanometer, it is shunted by a resistor 60. The anode voltage circuit is completed from the other end of the secondary winding 50, which is grounded, through a cathode resistor 61 to a cathode 62 common to both tube sections 41 and 44. A cathode by-pass condenser 63 is connected in parallel with the cathode resistor 61. Grounded shielding is provided at 70, 71, 72, 73 and 74.

Figure 2:
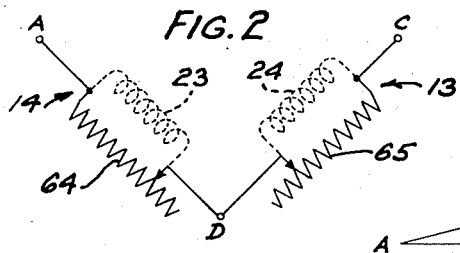
Fig. 2 is a wiring diagram of only a portion of the bridge circuit to illustrate the substitution of standard resistors for the inductances during calibration of the bridge.

In order to calibrate the apparatus, the secondary winding 35 of the transformer 34 is first shorted by closing a switch 64 connected between the terminals of the secondary winding thereby shutting off any possible signal voltage to the grids 40 and 43. The galvanometer circuit is then opened by operating the switch 55 and the galvanometer 53 is adjusted to its mechanical zero after which the switch 55 is closed and the galvanometer is then electrically balanced to zero by adjusting the variable resistor 52. Before proceeding further, the switch 64 should be opened to permit signals from the bridge 10 to reach the grids 40 and 43. The standard inductance 23 is removed from the circuit and an adjustable standard resistor 64 is substituted therefor in the circuit (Fig. 2) while another adjustable standard resistor 65 is connected into arm 13 in place of the inductance 24 under test. Both standard resistors 64 and 65 are next adjusted to some arbitrary value, for example, 1000 ohms each. Then the bridge control 22 is adjusted until the galvanometer 53 reads zero, thereby indicating that the bridge 10 is balanced and this position of the control 22 is indexed as zero.

The resistor 65 is then adjusted to increase its value to 1010 ohms, thereby making the resistance in arm 13 1% greater than the resistance in arm 14. Again control 22 is adjusted to balance the bridge 10 which, of course, will be indicated when the galvanometer 53 registers zero. This position of the control 22 may now be indexed with the character +1%. This procedure is repeated as many times as desired, for example, if a range of 10% is sought, the test may be repeated ten times, the resistance of the resistor 65 being increased 1% or 10 ohms after each repetition. In order to calibrate from zero to minus 10%, the same procedure may be used, reducing the resistance value of resistor 65 from 1000 ohms to 900 ohms in steps of 10 ohms after each test.

As now calibrated, the apparatus may be used to determine the deviation of an inductance to be tested from a given standard inductance provided the deviation is within ±10% of the standard inductance. For example, if an inductance coil 24 is constructed with physical dimensions and characteristics to provide an inductance of 500 millihenries, the completed coil may be tested by connecting the inductance 24 in arm 13 of the bridge 10 and connecting a standard inductance 23 having an inductance of 500 millihenries in arm 14 of the bridge. The bridge control 22 is then adjusted to balance out the effects of the inductance elements of the bridge and, when the inductive voltage component is balanced out as will be indicated by a zero reading on the galvanometer 53, the percentage of deviation of the inductance 24 from the standard inductance 23, if any, will be indicated on the dial of the calibrated control 22 provided the deviation is within ±10% or the range of the calibration.

Figure 3:
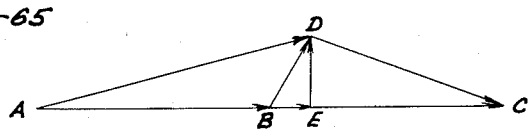
Fig. 3 is a vector diagram of the voltages across various elements of the bridge when it is inductively unbalanced with a preponderance of inductance in the arm.
Figure 4:
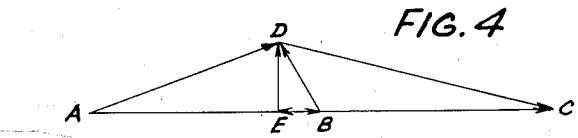
Fig. 4 is a vector diagram showing a preponderance of inductance in another arm.
Figure 5:
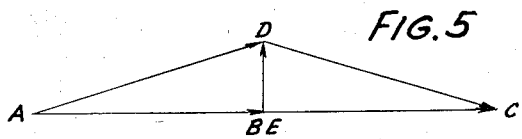
Fig. 5 is a vector diagram showing the inductive effects balanced out of the bridge output.

Inductive unbalance of either side of the bridge and inductive balance of the bridge are analytically illustrated in the vector diagrams of Figs. 3, 4 and 5 showing the voltage vectors across the arms of the bridge circuit before and after the effects of the inductive elements of the circuit have been balanced out. In Fig. 3 the vectors AB and BC represent the voltages across the arms 11 and 12 which contain resistive elements only and add up to the value of the input voltage to the bridge. The vectors AD and DC represent the voltages across the arms 14 and 13 which are the inductive portions of the bridge. The vector BD depicts the voltage across the points BD of the bridge and is a resultant of all voltage components in the output, for example, vectors DE and BE which represent, respectively, the vector component 90° out of phase with the input voltage AB—BC and BE the vector component which may be either in phase or 180° out of phase with the input voltage AB—BC. The vector DE represents the voltage component due to the resistive elements of the circuit and the vector BE, the voltage component due to the unbalanced inductive elements of the circuit. The length and the direction (in phase or 180° out of phase with the input voltage AB—BC) of the vector BE determines the degree of inductive unbalance and the arm of the bridge in which the inductance preponderates. Fig. 3 indicates that there is an inductive unbalance in the bridge circuit and, specifically, shows that the inductance in the arm 14 is greater than the inductance in the arm 13. Fig. 4 illustrates a preponderance of inductance in the arm 13. When the effects of the inductive elements have been balanced out of the circuit or when there is no inductive unbalance the vector BD will be oriented so that it will be at an angle of 90° or 270° with respect to the vectors AB and BC and the galvanometer will indicate zero because the detector portion of the circuit will not respond to output voltages 90° or 270° out of phase with the input voltage. Fig. 5 shows vector BD 90° away from vector AB—BC.

Where inductance coils are produced in large quantities, the measurement thereof may be more rapidly performed in the following manner: First, a standard inductance coil 23 is connected in the branch 14 of the bridge, and one of the coils 24 under test is connected in arm 13 of the bridge. As previously described, the galvanometer is adjusted to its mechanical zero and then electrically balanced by adjusting the variable resistor 52 while the switch 64 is closed. Then the switch 64 is opened and the bridge control 22 is adjusted to the position where the galvanometer reading will not change when the switch 64 is alternately opened and closed. After this adjustment, the switch 64 should be left open. Next the bridge control 22 must be adjusted so that its indicator is moved through a negative distance representing exactly 10% on its calibrated dial. For example, if the indication on the bridge control dial after this adjustment is +3%, then the bridge control dial is moved to indicate —7%. The variable resistor 54 is then adjusted so that the galvanometer indication is exactly at the end of the scale or ten main divisions from the center. Each main division will then correspond to 1%. Next, the bridge control dial is set to zero and the galvanometer indication will now be direct reading in percentage and will read three main divisions for the coil in the circuit. Subsequent test coils need merely to be connected one at a time in the bridge arm 13 and their percentage deviation read directly on the galvanometer. The amplitude of this reading is proportional to and controlled by that component of the vector BD which is either in phase with or 180° out of phase with the input voltage of the bridge and is indicated by the vector component BE. It is well to bear in mind that the input voltage of the bridge is in phase with the voltage impressed on the plates of the triode sections. The direction of the needle swing will be governed by the direction of the vector BE which will be either in phase or 180° out of phase with the input voltage depending on whether the coil under test has more or less inductance than the standard.

It is believed that the operation of the apparatus may be further explained by the reference to the curves of Figs. 6, 7 and 8 in which $E_p$ is the plate voltage; $E_g$ 41 and $E_g$ 44 are the signal voltages on the grids 40 and 43, respectively; and $I_p$ 41 and $I_p$ 44 are the plate currents in triode sections 41 and 44, respectively. The curves of Fig. 6 show the current flow through the triode sections at zero signal voltage. Current will, of course, flow at all times through both tubes because the circuit is adjusted for operation on a straight line portion of the tube curves. Since the same amount of current would flow through both triode sections at zero-signal, there would be no differential current to cause a deflection of the galvanometer which does not respond to instantaneous values. It will be seen from the circuit diagram and from the curves, that the impressed signal voltage on one grid is always 180° out of phase with the signal voltage impressed on the grid of the second tube although the signal voltage amplitude is the same.

The curves of Figs. 7 and 8 show the effects on plate current caused by signal voltage components in phase, 180° out of phase, 270° out of phase, and 90° out of phase with the plate voltage which is the same on both plates. In Fig. 8 signal voltages on the grids are shown in phase with the plate voltage in triode section 41 and 180° out of phase with the plate voltage in triode section 44. Under these conditions it will be seen that the plate current of triode section 41 rises and the plate current of triode section 44 falls, thereby causing a differential between the currents in both triode sections to which the galvanometer will respond.

The curves of Fig. 7 show the plate current in both triode sections when the signal voltage on one grid is 90° out of phase with the plate voltage and that on the other grid is 270° out of phase with the plate voltage. From an analysis of the curves, it will be seen that the integrated plate current of one triode section is equal to the integrated plate current of the other triode section although the instantaneous values of the respective currents are opposite in sequence. Since the meter will not respond to instantaneous values, the plate currents resulting from these grid signals will not produce any indication on the meter.

From the curves it will be seen that when the inductive voltage components of the bridge output are balanced out, the only component of the output voltage is one that is 90° or 270° out of phase with the plate voltage of the triode sections and will produce the condition shown in the curves of Fig. 7 resulting in no deflection of the galvanometer. However, if there is an inductive unbalance of the circuit, the output voltage of the bridge will contain not only a component which is 90° or 270° out of phase with the plate voltage but also a voltage component that will be in phase or 180° out of phase with the plate voltage. The output voltage is simultaneously applied to both grids in opposite phase as a signal voltage which on one grid will be in phase with the plate V and on the other grid will be 180° out of phase with the plate V thereby resulting in a net differential between integrated current values of the two triode sections and causing a deflection of the meter to indicate the amplitude and the direction of the inductance unbalance. The four curves of Figs. 7 and 8 taken together on the same time base illustrate the simultaneous effect on the tube currents by the various voltage components acting on the two triode sections.

Although the embodiment disclosed herein has been described for use with inductance coils, the invention may be used to determine the electrical characteristics of any reactive device. To determine electrical properties of condensers, for example, it would simply be necessary to substitute a standard condenser 80 and a condenser 81 under test for the inductance coils 23 and 24 respectively, as illustrated in Fig. 9.

What is claimed is:

1. An apparatus for measuring the value and direction of the electrical characteristics of a reactive device, said apparatus comprising an alternating current bridge comprising a pair of reactive arms having a conjugate point between them, a separate resistive arm connected to each reactive arm, and means for balancing out the effects of the reactive unbalance between said reactive arms, the last-said means being a resistor connected between the resistive arms, the resistor having a variable contact which together with the conjugate point between the reactive arms constitutes the output of the bridge, the input of the bridge being the conjugate points between the adjacent resistive and reactive arms, means for connecting a standard reactive device in one of said reactive arms, means to connect the device under test into the other reactive arm of said bridge, a source of alternating voltage connected to the input of said bridge, and means to measure voltage components of the output of said bridge that are either in phase or 180° out of phase with said source of alternating voltage comprising a pair of electronic tubes each having at least an anode, a grid and a cathode, means to apply the output voltage of said bridge to said grids in opposite phase relation, a second source of alternating current connected to said anodes, said second source of alternating current being in phase with said first source of alternating current, and an indicator responsive to the current differentials of said tubes to indicate the value and the direction of the electrical characteristics of said device under test.

2. An apparatus for detecting electrical characteristics of a reactive device, said apparatus comprising an electrical bridge having four arms, input terminals and output terminals, two of said arms being resistive in character, the third arm having a standard reactive device connected therein, the fourth arm having connected therein the device under test, there being a first conjugate point between one resistive arm and the third arm, a second conjugate point between the second resistive arm and the fourth arm, and a third conjugate point between the third and fourth arms, said first and second conjugate points being the input terminals of said bridge, means for balancing said bridge, said last means being a resistor connected between said resistive arms, the resistor having a variable contact for selectively contacting portions of the resistor between the resistive arms, the output terminals of the bridge being said variable contact and said third point a source of alternating voltage connected to said input terminals, and means coupled to said output terminals to detect and measure the voltage components appearing across said output terminals which are either in phase or 180° out of phase with the voltage appearing across said input terminals, said last means comprising two electronic tubes each having a control grid, an anode and a cathode, said control grids being coupled to said output terminals to effect a 180° phase separation between the signal voltage on said grids, a pair of resistors, one of said resistors being connected to each of said anodes, a source of anode voltage connected to said anodes through the resistors, said anode voltage being in phase with said source of alternating voltage, and an indicator responsive to the differential anode currents of said electronic tubes connected to said tubes.

3. An apparatus for determining the inductance deviation of an electrical device from an inductance standard comprising a bridge having two resistive arms, a third arm having said device connected therein, a fourth arm having said standard connected therein, input terminals, and output terminals, there being a first conjugate point between one of said resistive arms and the third arm, a second conjugate point between the second resistive arm and the fourth arm and a third conjugate point between the third and fourth arms, the input terminals being the first and second conjugate points, means for balancing said bridge comprising a resistor connected between said resistive arms, said resistor having a variable contact for selectively contacting desired portions of the resistor between the resistive arms, said output terminals being said third conjugate point and said variable contact, a source of alternating voltage connected to said input terminals, a transformer having a primary and a secondary winding, said primary winding being connected to said output terminals, a pair of triode electronic tubes, the grid of one tube being connected to one side of said secondary winding and the grid of the other tube being connected to the other side of said secondary winding, a source of anode voltage connected to said tubes, said source of anode voltage being in phase, with said source of alternating voltage, and an indicator responsive to plate current differentials of said tubes connected to the anodes of said tubes.

4. An apparatus for determining the capacitance deviation of an electrical device from a capacitance standard comprising a bridge having two resistive arms, a third arm having said device connected therein, a fourth arm having said standard connected therein, input terminals, and output terminals, there being a first conjugate point between one of said resistive arms and the third arm, a second conjugate point between the second resistive arm and the fourth arm and a third conjugate point between the third and fourth arms, said input terminals being the first and second conjugate points, means for balancing said bridge comprising a resistor connected between said resistive arms, said resistor having a variable contact for selectively contacting desired portions of the resistor between the resistive arms, said output terminals being said third conjugate point and said variable contact, a source of alternating voltage connected to said input terminals, a transformer having a primary and a secondary winding, said primary winding being connected to said output terminals, a pair of triode electronic tubes, the grid of one tube being connected to one side of said secondary winding and the grid of the other tube being connected to the other side of said secondary winding, a source of anode voltage connected to said tubes, said source of anode voltage being in phase with said source of alternating voltage, and an indicator responsive to plate current differentials of said tubes connected to the anodes of said tubes.

ARTHUR J. EHLSCHLAGER.

REFERENCES CITED

The following references are of record in the file of this patent:

UNITED STATES PATENTS

| Number | Name | Date |
|---|---|---|
| 1,660,405 | Affel | Feb. 28, 1928 |
| 1,825,514 | Fitzgerald | Sept. 29, 1931 |
| 1,919,538 | Stone | July 25, 1933 |
| 2,232,792 | Levin | Feb. 25, 1941 |
| 2,281,995 | Purington | May 5, 1942 |
| 2,320,175 | Dennis et al. | May 25, 1943 |
| 2,394,892 | Brown | Feb. 12, 1946 |
| 2,474,692 | Rosoff | June 28, 1949 |
| 2,490,377 | MacLean | Dec. 6, 1949 |